(12) United States Patent
Allgaier et al.

(10) Patent No.: US 11,226,215 B2
(45) Date of Patent: *Jan. 18, 2022

(54) MODULAR FIELD DEVICE KIT AND METHOD OF ASSEMBLY

(71) Applicant: VEGA GRIESHABER KG, Wolfach (DE)

(72) Inventors: Volker Allgaier, Haslach (DE); Christian Sum, Wolfach (DE)

(73) Assignee: VEGA GRIESHABER KG, Wolfach (DE)

( * ) Notice: Subject to any disclaimer, the term of this patent is extended or adjusted under 35 U.S.C. 154(b) by 61 days.

This patent is subject to a terminal disclaimer.

(21) Appl. No.: 16/383,302

(22) Filed: Apr. 12, 2019

(65) Prior Publication Data

US 2019/0250019 A1 Aug. 15, 2019

Related U.S. Application Data

(63) Continuation-in-part of application No. 15/397,302, filed on Jan. 3, 2017, now Pat. No. 10,306,343.

(30) Foreign Application Priority Data

Nov. 3, 2016 (DE) .................... 20 2016 106 172.5

(51) Int. Cl.
*G01D 11/24* (2006.01)
*G01L 19/00* (2006.01)
*G01L 19/08* (2006.01)
*G01D 11/30* (2006.01)
*G01L 19/14* (2006.01)

(52) U.S. Cl.
CPC ........... *G01D 11/245* (2013.01); *G01D 11/30* (2013.01); *G01L 19/0092* (2013.01); *G01L 19/086* (2013.01); *G01L 19/144* (2013.01)

(58) Field of Classification Search
CPC .. G01D 11/245; G01D 11/30; G01L 19/0092; G01L 19/086; G01L 19/144
USPC ...................................... 340/870.02
See application file for complete search history.

(56) References Cited

U.S. PATENT DOCUMENTS

2005/0289276 A1* 12/2005 Karschnia .......... G05B 19/4185
710/305
2007/0191970 A1* 8/2007 Orth ..................... G01D 18/008
700/17
2009/0222594 A1* 9/2009 Schwabe ............ G05B 19/4185
710/15
2010/0257930 A1* 10/2010 Isenmann ............. G01F 23/296
73/273

(Continued)

FOREIGN PATENT DOCUMENTS

DE 10 2009 022 762 A1 5/2009
DE 10 2013 103 454 A1 10/2014
DE 10 2013 106 098 A1 12/2014

OTHER PUBLICATIONS

GPTO Office Action for related application 10 2015 117 009.4, dated Jul. 18, 2016.

(Continued)

*Primary Examiner* — Albert K Wong
(74) *Attorney, Agent, or Firm* — William Gray Mitchell

(57) ABSTRACT

A modular field device kit with interchangeable components allowing for customization and a method of assembly of a field device using such kit.

13 Claims, 4 Drawing Sheets

(56) References Cited

U.S. PATENT DOCUMENTS

| | | | | |
|---|---|---|---|---|
| 2011/0171497 A1* | 7/2011 | McGuire | ................ | H01M 2/10 |
| | | | | 429/7 |
| 2012/0194405 A1* | 8/2012 | Brink | ..................... | H01Q 1/002 |
| | | | | 343/872 |
| 2014/0116241 A1* | 5/2014 | Valentin-Rumpel | .... | F15B 5/006 |
| | | | | 91/361 |
| 2014/0274181 A1* | 9/2014 | Lovegren | .......... | H04W 52/0203 |
| | | | | 455/509 |
| 2015/0002185 A1* | 1/2015 | McGuire | ................ | G01R 31/40 |
| | | | | 324/764.01 |
| 2015/0017842 A1* | 1/2015 | Jacobsson | .......... | G05B 19/0423 |
| | | | | 439/681 |
| 2015/0055305 A1* | 2/2015 | Mackey | ............... | H01R 13/514 |
| | | | | 361/733 |
| 2015/0055315 A1* | 2/2015 | Lu | ........................... | H01F 27/29 |
| | | | | 361/808 |
| 2016/0313155 A1* | 10/2016 | Iwashita | ............... | H03M 3/458 |
| 2017/0188472 A1* | 6/2017 | Grozinger | ............ | H05K 7/1462 |
| 2017/0346205 A1* | 11/2017 | Eriksson | ............. | H01R 12/721 |
| 2018/0110135 A1* | 4/2018 | Sum | ..................... | H05K 5/0247 |
| 2018/0307191 A1* | 10/2018 | Allgaier | ............... | H01R 9/2608 |

OTHER PUBLICATIONS

International search report for related international application PCT/EP2016/066838, dated Sep. 26, 2016.

\* cited by examiner

MODULAR FIELD DEVICE KIT AND METHOD OF ASSEMBLY

CROSS REFERENCE TO RELATED APPLICATIONS

This patent application claims priority to U.S. patent application Ser. No. 15/397,302, filed Jan. 3, 2017 and thereby to German Patent Application 20 2016 106 172.5, filed on Nov. 3, 2016.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The present invention relates to a modular field device kit and method of assembly.

Background of the Invention

In process automation technology, field devices frequently are used which serve for detecting and/or influencing process variables. Examples for such field devices are fill gauges, limit detectors, and pressure gauges with sensors detecting the respective process variables fill levels, limit, or pressure. Frequently such field devices are connected to superordinate units, such as guiding systems or control units. These superordinate units serve for process control, process visualization, and/or process monitoring. The field devices known from prior art generally comprise a housing, a sensor, and an electronics unit arranged in the housing.

The energy and/or signal transmission between the field device and the superordinate units occurs frequently based on the known 4 mA to 20 mA standard, in which a 4 mA to 20 mA power circuit and/or a two-wire line is formed between the field device and the superordinate unit. In addition to the analog transmission of signals here the option is provided that the measuring devices can transmit other information to the superordinate unit or receive them therefrom according to various other protocols, particularly digital protocols. Examples mentioned therefor are the HART-protocol or the Profibus-PA-protocol.

The energy supply of these field devices also occurs via the 4 mA to 20 mA power signal, so that in addition to the two-wire line no further supply line is necessary.

To keep the expense for wiring and installation as well as for security measures as low as possible, for example in applications in areas to be protected from explosion, it is also undesired to provide additional power supply lines.

For example, external control units are known from prior art which are connected to the 4 mA to 20 mA power circuit for the purpose of physically communicating with the field device in order to allow the control of the field device via the 4 mA to 20 mA power circuit via the HART protocol. Such external control units are disadvantageous here in that, as already mentioned, a physical connection is required to the 4 mA to 20 mA power circuit. For this purpose, the two-wire line must be modified such, for example insulated and/or severed, that the control unit can be connected. This represents a relatively high expense and cannot always be implemented easily on site.

It is also known from prior art to use radio modules for an easier control of the field devices. Solutions are known in which the field devices show integrated radio modules, radio modules are expensively retrofitted, or they are arranged in a measuring transducer—supply unit, a device for the energy supply of the field devices. In particular, in variants with integrated radio modules or a radio module to be retrofitted, the problem is given in prior art that in case of an energy supply via the 4 mA to 20 mA power circuit here only extremely low power is available and the energy that can be supplied via the power circuit is partially insufficient in order to supply simultaneously the electronics unit and the sensor with energy, so that operation cannot occur or only under aggravated conditions.

In prior art solutions are provided therefor in which the radio module is provided with its own supply line or additional batteries are provided in the field device for operating the radio module. Separate supply lines however require the above-mentioned increased installation and security expense, which shall be avoided. All field device equipped with radio modules are subject to the additional risk that they cannot be controlled at all times so that an unintentional operation or even an intentional manipulation could not be excluded or prevented at all times.

The objective of the present invention is to allow a user to combine various interchangeable field device components to customize one or more field devices, including a simple retrofitting of radio modules and to prevent any attacks or hacking by targeted manipulation of field devices. This objective is attained in a modular field device kit and assembly system with the features as described herein.

BRIEF SUMMARY OF THE INVENTION

In a preferred embodiment, a modular field device kit for assembling customized field devices from interchangeable, modular components, comprising:
  a plurality of housings,
  a plurality of sensors,
  a plurality of electronics units for connection to the sensors, and
  a plurality of display and/or control units that can be connected to the electronics units, with the kit comprising at least one display and/or control unit with a radio module for the wireless communication with at least one other radio module,
wherein a user may assemble a customized field device by choosing and connecting one or more of each specific modular component from each plurality.

In another preferred embodiment, the modular field device kit as described herein, wherein the radio module comprises a control element, particularly a switch or sensor, for activating and deactivating the radio module, which is arranged such that a mechanic activation of the control element is only possible when the field device is deactivated by the display and/or control unit being removed from the field device.

In another preferred embodiment, the modular field device kit as described herein, wherein the control element is accessible only when the radio module is removed.

In another preferred embodiment, the modular field device kit as described herein, wherein display and/or control information is transmitted by wire between the display and/or control unit and the electronics unit.

In another preferred embodiment, the modular field device kit as described herein, wherein display and/or control information is wirelessly transmitted via the radio module between the display and/or control unit and the electronics unit.

In another preferred embodiment, the modular field device kit as described herein, wherein the radio module is mechanically anchored and the control element is arranged at the bottom of the radio module such that the control element is accessible only after releasing the anchoring and removing the radio module from its housing.

In another preferred embodiment, the modular field device kit as described herein, wherein the radio module comprises a separate, integrated energy supply, particularly a battery for the partial or complete energy supply of the radio module.

In another preferred embodiment, the modular field device kit as described herein, wherein the radio module comprises a timer unit.

In another preferred embodiment, the modular field device kit as described herein, wherein, after activation of the radio module, the radio module remains activated for a predetermined period and then is automatically deactivated by the timer unit.

In another preferred embodiment, the modular field device kit as described herein, wherein the electronics unit and the display and/or control unit each comprise a radio module, with the radio modules being embodied such that they receive radio signals from another radio module and transmit them.

In another preferred embodiment, the modular field device kit as described herein, wherein the radio module or the display and/or control unit can be arranged in a housing.

In an alternate preferred embodiment, a method of assembling a field device using the modular field device kit as described herein, comprising the steps of:
attaching a housing to a sensor,
connecting the sensor to an electronics unit arranged in the housing, and
connecting a display and/or control unit to the electronics unit.

In another preferred embodiment, the method described herein, wherein the display and/or control unit further comprises a radio module.

In another preferred embodiment, the method described herein, further comprising the step: disconnecting a display and/or control unit lacking a radio module from the electronics unit and replacing the disconnected unit with an alternate display and/or control unit comprising a radio module.

DETAILED DESCRIPTION OF THE INVENTION

Figure 1:
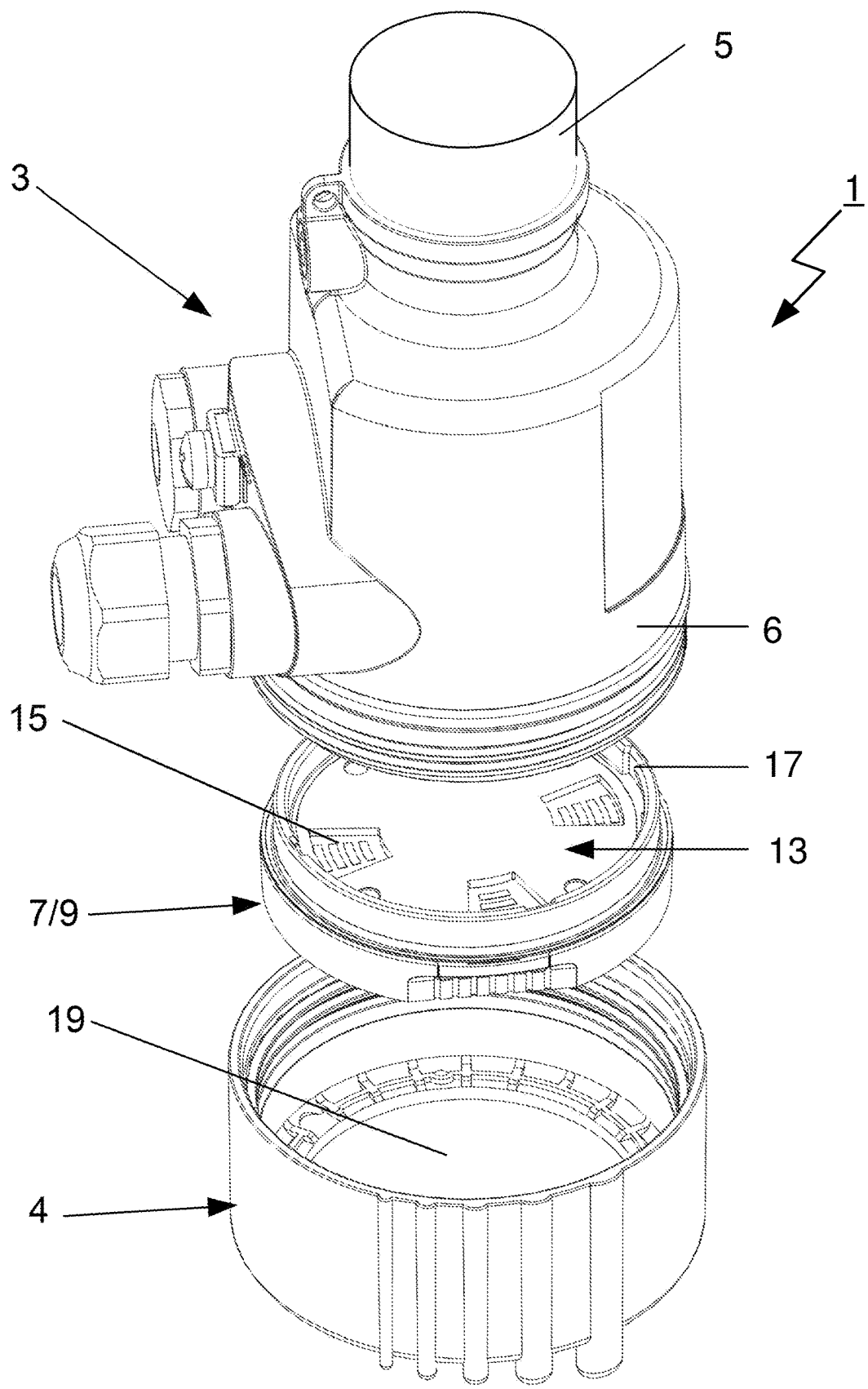
FIG. 1 is a line drawing evidencing a perspective exploded illustration of a first exemplary embodiment of a modular field device kit and method of assembly according to the present invention.

The invention is a modular field device assembly system, operating as a construction kit for personalized field devices.

Such a kit would comprise a plurality of housings, a plurality of sensor types, as well as a plurality of different display and/or control units that can be connected to the sensors and different electronics units, with the field device system comprising at least one display and/or control unit with a radio module for the wireless communication with another unit, as well as a memory for retaining data from the sensor.

Such a modular field device kit comprises a number of exchangeable modules, adjusted to each other, but comprising the at least one display and/or control element showing an integrated radio module. This way, field devices initially embodied without a radio module, including older devices already employed in the field, can be retrofitted by equipped with a radio module by a simple exchange of the old, wired display and/or control unit for a new, radio-enabled display and/or control unit. This way it is easily possible to retrofit even older field devices with a modular design.

In a further development, the radio module may comprise a control element, particularly a switch or sensor, in order to activate and deactivate the radio module which is mechanically arranged such that any operation is possible only with the field device being deactivated, particularly when the display and/or control unit is removed from the field device.

The kit and assembly system will yield a field device(s) comprising a housing, a sensor, and an electronics unit arranged in the housing, as well as a radio module that can be connected to the electronics unit and disconnected therefrom. Such an embodiment of the radio module is advantageous in that even older field devices, previously operated without any radio module, can easily be retrofitted with a radio module.

The housing of the radio module is advantageously made from a synthetic material. Modular housing options may differ in size, shape, protection class, type of material, etc. The choice of modular electronics units of the kit also may differ in the kind of signal processing and interfaces offered to a user. For example, types of bus interfaces, digital vs. analog faces, etc. may be employed.

The modular sensor options may include differing measurement categories such as pressure, temperature, fill level, point level detection, etc., as well as different measurement ranges, such as high pressure, low pressure, high temperature, low temperature, etc., and different measurement principles, such as capacitive, resistive, vibration/frequency, etc. The available display and control unit modules will also differ in both type of display, such as LEDs, alphanumeric display, monochrome, colored, etc., and in their control capabilities. Such control units will also preferably comprise a memory component for the retention and preservation of sensor data readings over time. However, at least one control and display unit comprises the radio module according to the present application.

For assembling one customized field device a user will choose one part from each category out of the construction kit, i.e. one housing, one sensor, one electronics unit, one control and display unit. All the above components are designed with matching connectors, data exchange and size of the components, to allow for easy initial assembly, as well as replacement of a given module should the needs of the user change.

Available communication protocols for a given radio module include, without limitation, radio frequency, WiFi, RFID, Bluetooth and Near Field Communication (NFC) protocols. Utilizing at least one such protocol, each radio-enabled modular device can establish wireless communication with at least one other unit refers to the possibility that different units may be connected via the radio module. The communication may take place between the field device and a superordinate unit, e.g. a control room, the field device and another field device, e.g. in a mesh network, or between the field device and a handheld configuration and display unit, e.g. a mobile device for displaying the measurement values and configuring the field device.

In another further development the radio module comprises a control element for activating and deactivating the radio module, which is arranged mechanically such that any operation of the control element is possible only in case of a deactivated field device, and/or in case of the control unit being removed, and/or in case of an open housing. Such an arrangement of the control element for activating and deactivating the radio module shows the advantage that any activation or deactivation of the radio module cannot occur without being noticed, because any deactivation of the field device by a superordinate unit, for example a superordinate control, is registered in any case. Further, by an appropriate mechanic arrangement it is ensured that any accidental activation or deactivation of the radio module is excluded.

Such an operating element can further be beneficial for aspects of energy in order to completely deactivate the radio module and for example to completely prevent any search operations for available communication partners or the like. This way, additionally considerably lower energy consumption can be achieved.

A beneficial mechanic arrangement is yielded when the control element is arranged such that it is accessible only when the radio module has been removed. If the radio module is usually connected mechanically and electrically to the electronics unit it can be ensured this way that by removing the radio module from the electronics unit here a deactivation of the field device is initiated so that it can be detected in a superordinate unit.

An optimal embodiment is yielded here when the radio module is arranged in a display and/or control unit, with the housing thereof preferably being made from a synthetic material.

Usually field devices according to prior art are equipped with a display and/or control unit, allowing on site for example to read measurements or configurations of the field device. By an integration of the radio module in such a display and/or control unit here a space-saving design as well as an electrically beneficial design can be yielded, because the display and/or control unit is generally also equipped with respective electronic components for displaying measurements and/or the configuration of the field device. In such a configuration it is possible that the radio module only transmits the already processed measurements or respective configuration features and thus multiple appropriate electronic components no longer need to be installed.

Advantageously the display and/or control information is transmitted by wires between the display and/or control unit and the electronics unit. If therefore the radio module is also arranged in the display and/or control unit here too a wired transmission of the display and/or control information occurs between the radio module and the electronics unit. A respective design allows a particularly easy integration of the radio module in existing field device concepts, with here particularly no changes are required at the electronics unit.

It shall be mentioned at this point that any communication between the electronics unit and the radio module can occur via wires even without the radio module being arranged in a display and/or control unit.

Alternatively, it is also possible, though, that the display and/or control information is transmitted in a wireless fashion via the radio module between the display and/or control unit and the electronics unit and/or between the radio module and the electronics unit. In this case it is conditional though that the electronics unit already comprises a radio module by which radio communication is possible.

A particularly clever arrangement can be achieved when the radio module is mechanically anchored such that the control element is arranged at a bottom of said radio module such that the control element is accessible only after the anchoring has been released and the radio module has been removed from its housing. If for example the radio module is mechanically fastened via a latching or bayonet fastener to the electronics unit, any control element provided at the bottom of the radio module, i.e. at a side of the radio module facing the electronics unit, can only be operated when the mechanic anchoring of the radio module has been released and it has been removed from the electronic module.

Advantageously the field device can further be locked mechanically and embodied in a fashion to protect against unauthorized access. This way, by an appropriate embodiment of the housing, manipulations can be prevented in a more effective fashion.

Specifically, for field devices in which radio modules shall be retrofitted, but also in field devices in which regularly radio modules are provided it can be advantageous for the radio module to comprise an integrated separate energy supply, particularly a battery, for the partial or complete energy supply of the radio module. This can be particularly advantageous for field devices, operated with low power or in which retrofitting radio modules was previously not provided within the energy concept of the field device, because this way the operation of a radio module can occur independently from the energy supply of the field device. However, it can also be beneficial for field devices in which the radio module is not retrofitted but is already considered within the energy concept of the field device. Such a battery, for example, can provide additional energy to increase the range of the radio module or the band width of the radio communication required for certain applications.

The radio module can further comprise for example a timer unit so that the radio module can be activated only at certain times.

Such a timer unit can also be used to ensure that the radio module remains activated for a predetermined period and then is automatically deactivated. This way it is possible for example that the radio module is active for a certain configuration, for example for 10 minutes, with the radio module then automatically being deactivated so that on the one hand here energy is saved and on the other hand any attempts for manipulation are effectively countered by the radio interface.

Further the electronics unit and/or the display and/or the control unit may each show a radio module, with the radio modules being embodied such that they receive radio signals from another radio module and transmit them. This way an effective increase in range of the radio modules of the field devices can be yielded, allowing wide ranges even in case of low transmission power of the radio modules.

In the following the present invention is explained in detail based on an exemplary embodiment as appearing in the attached figures.

DETAILED DESCRIPTION OF THE FIGURES

FIG. 1 shows the components a modular field device kit 1 according to the present invention, as well as the method of assembly of a field device utilizing modular components contained in the kit. Each component of such kit 1 is modular in nature and interchangeable with other components manufactured to similar physical specifications, thus allowing for customization of individual field devices by the user. The field device 1 comprises essentially a housing 3, in which an electronics unit 6 is arranged (not shown here). At one end the electronics unit 6 is connected to a sensor 5, in the present case indicated only schematically, which is arranged at the housing 3. The sensor 5 may however also be arranged via respective measuring lines off-set from the housing 3, and for example via appropriate extensions be arranged in a measuring environment.

The field device assembled from kit 1 can for example be connected via a two-wire line, guided through an appropriate opening in the housing 3, to a superordinate unit, for example a control or measuring station.

At a side opposite the sensor side in the present exemplary embodiment a display and/or control unit 7 is shown with an integrated radio module 9.

The display and/or control unit comprises a housing made from a synthetic material. This way, signals of the radio module can be decoupled in a particularly beneficial fashion. The display and/or control unit 7 can be mechanically connected to the electronics unit 6 via a bayonet fastener 17 provided at a circumferential brim of the display and/or control unit, with in case of a mechanic connection simultaneously via fastening contacts 15, which are arranged at the bottom of the display and/or control unit 7, an electric connection being generated here. At a side of the display and/or control unit 7 facing away from the electronics unit 6 in the present exemplary embodiment a display is provided to show measurements or other device-specific information as well as a keypad for entering operator information, for example for the configuration of the electronics unit 6. In the present exemplary embodiment the housing 3 can be closed with a lid 4, with a viewing window 19 being arranged in the lid 4 such that the display unit of the display and/or control unit 7 remains visible from the outside even when the lid 4 is placed thereon.

In the present case the field device 1 is a part of a modular system for generating field devices 1. The modular field device system comprises a plurality of components, adjusted to each other, which can be combined with one another based on customer and/or process requirements.

This way it is particularly possible to retroactively reach via radio a modularly designed field device 1, which had been designed without any radio module 9, by exchanging the existing display and/or control unit for a display and/or control unit 7 with an integrated radio module 9, or to allow such a configuration.

Figure 2:
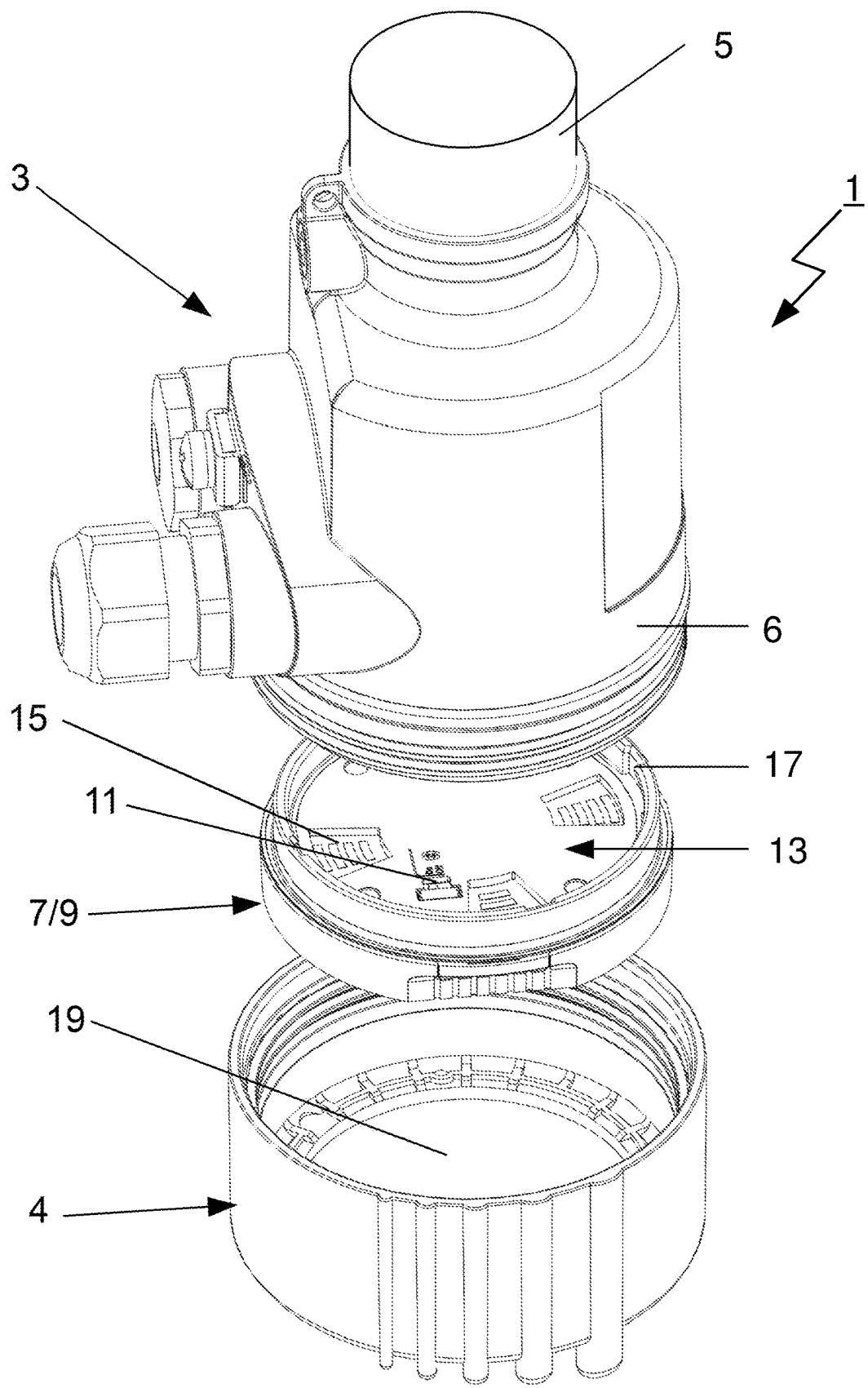
FIG. 2 is a line drawing evidencing a further development of the exemplary embodiment of FIG. 1 with a control element.

FIG. 2 shows a display and/or control unit 7 of the exemplary embodiment of FIG. 1 at the side facing the electronics unit 6 comprising a control element 11 to activate and deactivate the radio module 9 arranged in the display and/or control unit 7. The control element 11 is embodied as a mechanic slide switch in the present exemplary embodiment, however it can also be embodied as a rocker switch, push button, magnetic switch, or the like.

The control element 11 is accessible in the present exemplary embodiment for activating and deactivating the radio module 9 only when the display and/or control unit 7 is disconnected from the electronics unit 6 and removed from the housing 3. This way an effective protection from faulty operation is given.

Further, by the fact that the display and/or control unit 7 must be removed from the electronics unit 6 in order to operate the control element 11 here a temporary deactivation of the field device 1 overall is also initiated so that by the temporary deactivation of the field device 1 any manipulations can easily be detected.

Figure 3:
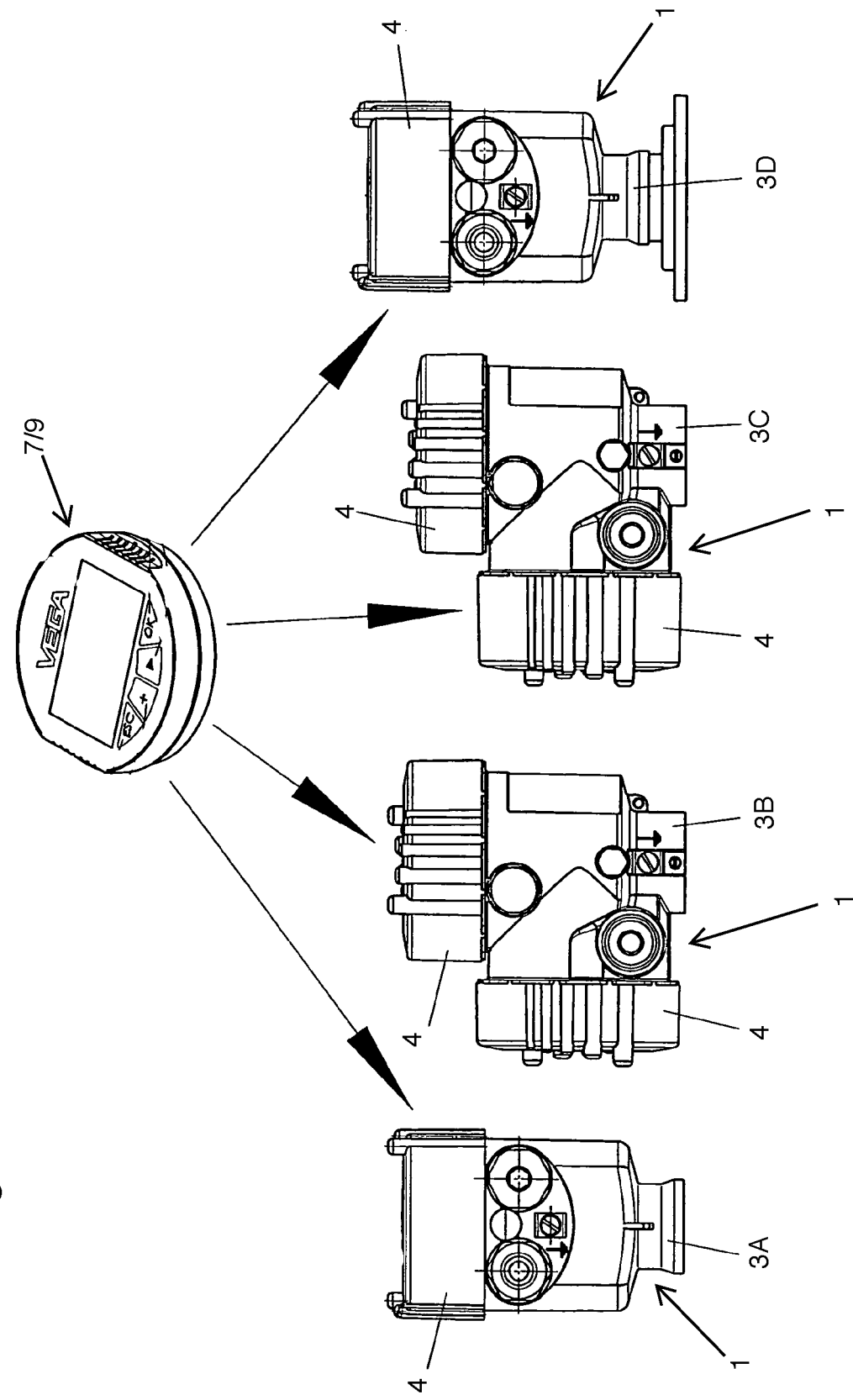
FIG. 3 is a line drawing evidencing the modular field device of FIG. 1 with various styles of interchangeable housings.

FIG. 3 schematically shows the various kinds of use of a single modular field device 1 such as it has been described above, on various housings 3A-3D. The housing 3A of an electronic equipment, for example, is a single-chamber housing that may be used for most diverse kinds of electronic equipment explained in more detail in FIG. 4.

A modular field device 1 may be mounted to this housing 3A and may be screwed by means of the lid 4.

Housing 3B is a dual-chamber housing featuring two possibilities for mounting components, in one case on the top, in the other on the side. In each case, a lid 4 may be screwed on.

On housing 3C, the different mounting of the modular field device 1 is visible. A further housing design 3D is shown on the right side in FIG. 3.

In conclusion, it has to be noted that the sensor and lid may be mounted to various housings, and the lid in each case will contain the display and/or control unit (not pictured). Moreover, the housings 3A-3D may be made of various materials. This, depending on the purpose of application, e.g. a plastic housing, a V4A housing or an aluminum housing may be concerned.

Figure 4:
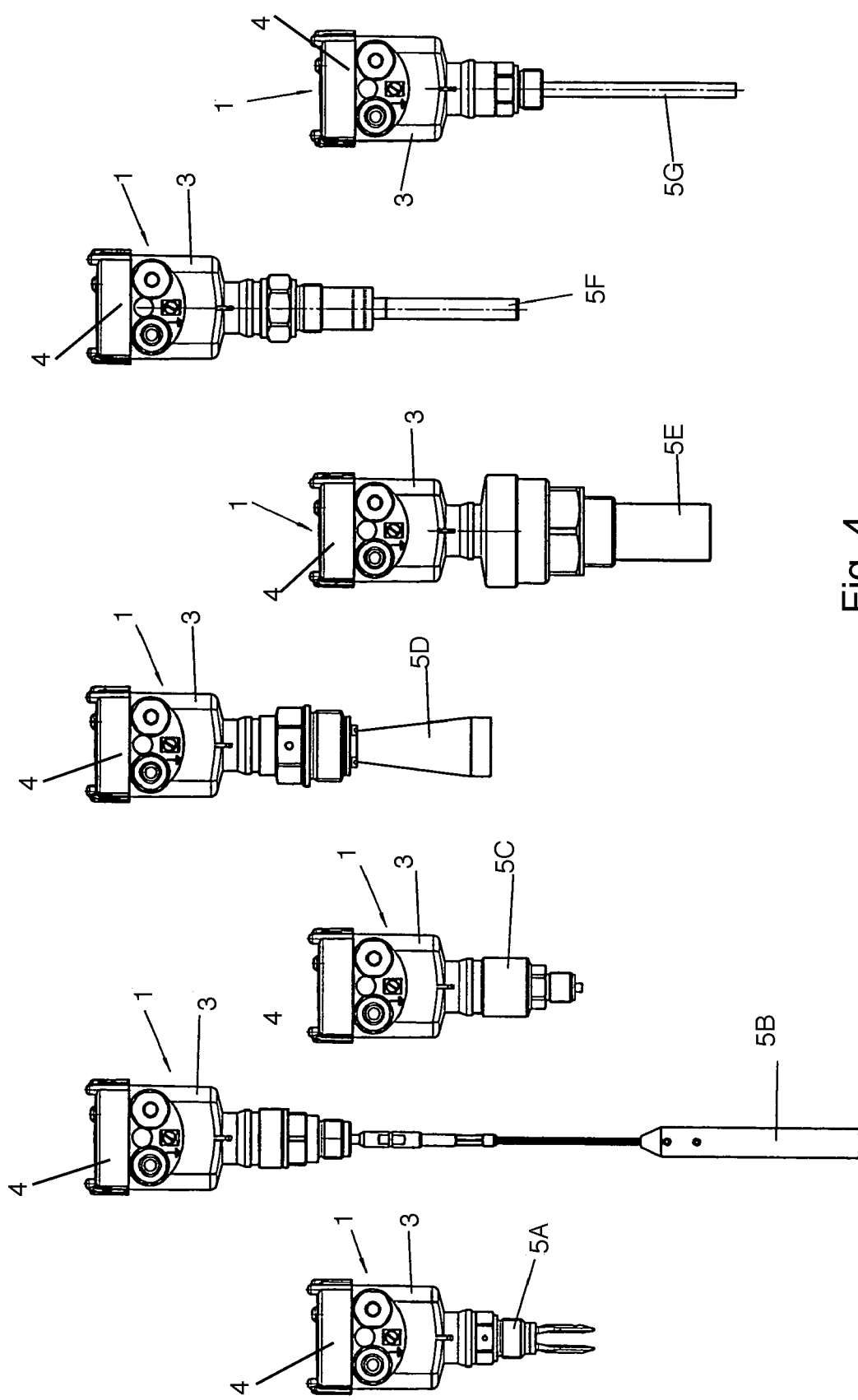
FIG. 4 is a line drawing evidencing the modular field device of FIG. 1 with various styles of interchangeable sensors.

FIG. 4 shows a variety of interchangeable sensors 5A-5G, each attached to a housing 3, one or two lids 4 and a display and/or control unit 7 comprising a radio module 9. On the very left, there is shown a field device comprising a swing fork 5A as a sensor. Here, it is provided with a housing 3. Furthermore, a lid 4 may be screwed on, overlaying the display and/or control unit 7, which is thus not visible in the drawings of the assembled field devices 1.

The second field device from the left is a TDR filling level sensor 5B from which a microwave is emitted in a guided manner and reflected echoes return to the device. This sensor 5B, as well, is mounted on a housing 3. The pressure sensor 5C shown at the right side of the aforementioned 5B likewise features an identical housing 3 and a lid 4.

At the right side of the pressure sensor 5C, a filling level radar sensor/horn antenna 5D is shown. The housing 3 again is designed in the manner described before. At the right side of the filling level radar sensor 5D, a further filling level radar sensor 5E is shown. The housing 3 is designed as it is the case with the filling level radar sensor 5D.

Further to the right, a limit state detection sensor 5F is shown. Again, the sensor has a housing 3 of the construction described before including a lid 4.

Finally, at the very right of FIG. 4, a capacitive filling level sensor 5G is shown. Again, this filling level sensor is equipped with a housing 3 and lid 4 of the design described before.

Thus, it can be clearly recognized that all of the different measurement principles and the corresponding sensors may be equipped with the same modular field device 1, for which purpose these housings are of the same design. Therewith, a simple and modular exchange of a field device 1 on various housings and/or sensors is possible. At the same time, it is rendered possible that a user always is faced with the same operation due to the field device 1, independent of the present sensor, and accordingly, the menu mode, as well, is similar.

LIST OF REFERENCE NUMBERS

1 modular field device kit
3A-3D housings
4 lid
5A-5G sensors
6 electronics unit
7 display and/or control unit
9 radio module
11 control element
13 bottom
15 contacts
17 bayonet fastening
19 viewing window The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

We claim:

1. A modular field device kit for assembling customized field devices from interchangeable, modular components, comprising:
    a plurality of housings,
    a plurality of sensors,
    a plurality of circuits for connection to the sensors, and
    a plurality of display and/or control units that can be connected to the plurality of circuits, with the kit comprising at least one display and/or control unit with an integrated radio module for a wireless communication with at least one separate radio module, and
    a control element embodied as a switch or sensor for activating and deactivating the radio module, which control element is mechanically arranged such that the control element can be operated only when the display and/or control unit is disconnected from the field device kit,
wherein a user may assemble a customized field device by choosing and connecting one or more of each specific modular component from each plurality.

2. The modular field device kit according to claim 1, wherein the control element is accessible only when the radio module is removed.

3. The modular field device kit according to claim 1, wherein display and/or control information is transmitted by wire between the display and/or control unit and the circuits.

4. The modular field device kit according to claim 1, wherein display and/or control information is wirelessly transmitted via the radio module between the display and/or control unit and the circuits.

5. The modular field device kit according to claim 1, wherein the radio module is mechanically anchored and the control element is arranged at the bottom of the radio module such that the control element is accessible only after releasing the anchoring and removing the radio module from its housing.

6. The modular field device kit according to claim 1, wherein the radio module comprises a battery for the partial or complete energy supply of the radio module.

7. The modular field device kit according to claim 1, wherein the radio module comprises a timer unit.

8. The modular field device kit according to claim 7, wherein, after activation of the radio module, the radio module remains activated for a predetermined period and then is automatically deactivated by the timer unit.

9. The modular field device kit according to claim 1, wherein the circuits and the display and/or control unit each comprise a radio module, with the radio modules being embodied such that they receive radio signals from another radio module and transmit them.

10. The modular field device kit according to claim 1, wherein the radio module or the display and/or control unit can be arranged in a housing.

11. A method of assembling a field device using the modular field device kit of claim 1, comprising the steps of:
    attaching a housing to a sensor,
    connecting the sensor to the circuit arranged in the housing, and
    connecting the display and/or control unit to the circuit.

12. The method of claim 11, wherein the display and/or control unit further comprises a radio module.

13. The method of claim 11, further comprising the step:
    disconnecting a display and/or control unit lacking a radio module from the circuit and replacing the disconnected unit with an alternate display and/or control unit comprising a radio module.

* * * * *